United States Patent
Zhou (10) Patent No.: US 10,001,582 B2
(45) Date of Patent: Jun. 19, 2018

(54) METHOD FOR USING PULSED NEUTRON INDUCED GAMMA RAY MEASUREMENTS TO DETERMINE FORMATION PROPERTIES

(71) Applicant: Schlumberger Technology Corporation, Sugar Land, TX (US)

(72) Inventor: Tong Zhou, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days. days.

(21) Appl. No.: 15/016,090

(22) Filed: Feb. 4, 2016

(65) Prior Publication Data

US 2017/0227671 A1    Aug. 10, 2017

(51) Int. Cl.
*G01V 5/10* (2006.01)

(52) U.S. Cl.
CPC .................... *G01V 5/102* (2013.01)

(58) Field of Classification Search
CPC ............................ G01V 5/10–5/108
See application file for complete search history.

(56) References Cited

U.S. PATENT DOCUMENTS

| 4,464,569 A | 8/1984 | Flaum |
| 4,645,926 A * | 2/1987 | Randall ................. G01V 5/102 250/256 |
| 5,293,410 A | 3/1994 | Chen et al. |
| 5,498,960 A | 3/1996 | Vinegar et al. |
| 5,539,225 A | 7/1996 | Loomis et al. |
| 5,608,215 A | 3/1997 | Evans |
| 5,699,246 A | 12/1997 | Plasek et al. |
| 5,804,820 A | 9/1998 | Evans et al. |

(Continued)

FOREIGN PATENT DOCUMENTS

| EP | 2426516 A2 | 3/2012 |
| WO | WO2010135618 A2 | 11/2010 |

(Continued)

OTHER PUBLICATIONS

International Seach Report and Written Opinion Issued in the related PCT Application PCT/US2013/034343, dated Jul. 11, 2013 (8 pages).

(Continued)

*Primary Examiner* — Casey Bryant
(74) *Attorney, Agent, or Firm* — Michael Dae (57) ABSTRACT

A method for determining a petrophysical property of a formation includes detecting gamma rays at two different spaced apart positions from a position of emitting neutrons into the formation at an energy level sufficient to induce inelastic scatting gamma rays. The neutrons are emitted in a plurality of bursts of neutrons into the formation, the bursts each having a first selected duration. Each burst is followed by a wait time having a second selected duration, the gamma rays detected during each of the bursts and each of the wait times. A ratio of numbers of gamma rays detected during the bursts is determined (burst ratio). A ratio of numbers of gamma rays detected during the wait times is determined (capture ratio). The burst ratio is used to correct the capture ratio. The petrophysical property is determined from the corrected capture ratio.

16 Claims, 6 Drawing Sheets

(56) References Cited

U.S. PATENT DOCUMENTS

| | | | |
|---|---|---|---|
| 5,909,772 A * | 6/1999 | Merkel | E21B 43/00 |
| | | | 166/250.16 |
| 6,703,606 B2 | 3/2004 | Adolph | |
| 6,754,586 B1 | 6/2004 | Adolph et al. | |
| 6,884,994 B2 | 4/2005 | Simonetti et al. | |
| 7,667,192 B2 | 2/2010 | Fricke et al. | |
| 8,471,197 B2 | 6/2013 | Inanc et al. | |
| 9,268,056 B2 * | 2/2016 | Zhou | G01V 5/101 |
| 9,310,515 B2 | 4/2016 | Zhou et al. | |
| 2002/0170348 A1 | 11/2002 | Roscoe et al. | |
| 2004/0128073 A1 | 7/2004 | Radtke et al. | |
| 2006/0226351 A1 | 10/2006 | Stoller et al. | |
| 2006/0284066 A1 | 12/2006 | Jacobson | |
| 2007/0023626 A1 | 2/2007 | Riley et al. | |
| 2009/0210161 A1 | 8/2009 | Duenckel et al. | |
| 2011/0001040 A1 | 1/2011 | Smith, Jr. et al. | |
| 2011/0213555 A1 | 9/2011 | Kopal et al. | |
| 2011/0284731 A1 | 11/2011 | Roscoe et al. | |
| 2011/0313669 A1 | 12/2011 | Thornton | |
| 2012/0016588 A1 | 1/2012 | Evans et al. | |
| 2012/0126106 A1 | 5/2012 | Zhou et al. | |
| 2012/0148004 A1 | 6/2012 | Caruso et al. | |
| 2012/0197529 A1 | 8/2012 | Stephenson et al. | |
| 2012/0215451 A1 | 8/2012 | Husser et al. | |
| 2013/0105678 A1 | 5/2013 | Wilson et al. | |
| 2013/0166223 A1 | 6/2013 | Triplett | |
| 2013/0282288 A1 | 10/2013 | Quinn et al. | |
| 2014/0042311 A1 * | 2/2014 | Zhou | G01V 5/102 |
| | | | 250/269.8 |
| 2014/0088877 A1 | 3/2014 | Ellis et al. | |
| 2014/0129149 A1 | 5/2014 | Gzara et al. | |
| 2014/0343856 A1 * | 11/2014 | Zhou | G01V 5/104 |
| | | | 702/8 |
| 2015/0226874 A1 | 8/2015 | Inanc et al. | |
| 2015/0247948 A1 * | 9/2015 | Zhou | G01V 5/101 |
| | | | 250/252.1 |
| 2015/0268376 A1 * | 9/2015 | Zhou | G01V 5/107 |
| | | | 250/254 |
| 2015/0331141 A1 | 11/2015 | Grau et al. | |
| 2016/0003025 A1 * | 1/2016 | Beekman | G01V 5/104 |
| | | | 250/269.5 |
| 2016/0003969 A1 * | 1/2016 | Zhou | G01V 5/102 |
| | | | 250/269.7 |
| 2016/0349398 A1 | 12/2016 | Zhou et al. | |
| 2016/0349399 A1 | 12/2016 | Zhou | |
| 2017/0160425 A1 | 6/2017 | Miles et al. | |

FOREIGN PATENT DOCUMENTS

| | | |
|---|---|---|
| WO | WO2012012101 A2 | 1/2012 |
| WO | WO2012012120 A2 | 1/2012 |
| WO | WO2012083210 A2 | 6/2012 |

OTHER PUBLICATIONS

International Preliminary Report on patentability Issued in the related PCT Application PCT/US2013/034343, dated Oct. 1, 2014 (6 pages).

European Search Report issued in the related EP Application 13769611.8, dated Mar. 3, 2016 (5 pages).

Communication pursuant to Article 94(3) issued in the related EP Application 13769611.8, dated Mar. 23, 2016 (6 pages).

Robert Freedman, et al., A modern method for using databases to obtain accurate solutions to complex reservoir characterization problems, SPE Reservoir Evaluation & Engineering, Dec. 31, 2011, SPE 147169, pp. 1-15.

International Seach Report and Written Opinion Issued in the related PCT Application PCT/US2014/037672, dated Sep. 2, 2014 (14 pages).

International Preliminary Report on patentability Issued in the related PCT Application PCT/US2014/037672, dated Nov. 17, 2015 (10 pages).

* cited by examiner

METHOD FOR USING PULSED NEUTRON INDUCED GAMMA RAY MEASUREMENTS TO DETERMINE FORMATION PROPERTIES

CROSS-REFERENCE TO RELATED APPLICATIONS

Not Applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND

This disclosure is related to the field of neutron well logging measurements for determining petrophysical properties of subsurface formations traversed by a wellbore. More specifically, the disclosure relates to using various neutron cross section values determined from neutron measurements to determine one or more petrophysical parameters of such formations.

Various neutron based measurements have been used to evaluate characteristics of subsurface formations from a wellbore since at least the 1950s. Neutrons can interact with subsurface formations in different ways. They can be scattered elastically, which means kinetic energy and momentum are conserved; they can be scattered inelastically, which means certain nuclei go into an excited state while kinetic energy is lost; they can also be captured by a nucleus to form a new nucleus; it is also possible that the neutron interaction causes a nuclear reaction resulting in the emission of one or more nucleons from the target nucleus. The probability of a neutron interacting with a nucleus is measured by the respective interaction cross section, which is a function of many parameters, such as incident neutron energy, outgoing neutron energy (if a neutron emerges from the interaction), scattering angle, interaction type and interactive nucleus type, among others. Thus, neutrons can enable measurement of many different formation properties due to the variety and complexity of their interactions.

An important wellbore neutron measurement known in the art is the thermal neutron die-away measurement. This is a measure of how fast thermal neutrons disappear. If the rate of disappearance ("decay") is approximated by an exponential function then the decay exponent ("decay constant") can be used to directly determine the formation thermal neutron capture cross section. In the oil and gas industry the macroscopic neutron capture cross section of the formation is called "sigma". Typically this cross section is measured in capture units (c.u.), where 1 capture unit is equal to 1000 cm¹.

Another important wellbore neutron measurement known in the art is the neutron porosity measurement. The basic principle of such measurement is to impart high energy neutrons (typically several MeV depending on the source type) into the formation and measure the thermal (or epithermal) neutron flux at a certain distance from the source. The detector can be either a neutron detector or a gamma ray detector (measuring neutron induced gamma rays as an indirect measurement of the neutron flux). This measurement is very sensitive to the hydrogen content in the formation because hydrogen is the most effective neutron moderator among all elements. High hydrogen content can slow down neutrons to thermal energy (0.025 eV at room temperature) before they can travel very far. Thus, HI (Hydrogen Index) and porosity (fresh water filled) may be used to interpret the measurement. A limitation of the neutron porosity measurement is that it is accurate only for water filled, clean (clay free) single lithology (such as sandstone, limestone and dolomite) formations. Some other environmental conditions need special treatment, such as gas-filled porosity, shale, and complex lithology. In addition, the thermal neutron porosity measurement is sensitive to temperature and to borehole and formation salinity.

Slowing-Down Length (Ls) is a parameter that describes how far a fast neutron travels on average before it is slowed down to thermal energy. It has been used in the past to interpret the neutron porosity measurement as well. The tool response can be predicted accurately, but the limitation is that Ls does not follow a volumetric mixing law. Thus, this technique is not widely used by petrophysicists.

SUMMARY

A method according to one aspect relates to a method for determining a petrophysical property of a formation. The method includes detecting gamma rays at two different spaced apart positions from a position of emitting neutrons into the formation at an energy level sufficient to induce inelastic scatting gamma rays. The neutrons are emitted in a plurality of bursts of neutrons into the formation, the bursts each having a first selected duration. Each burst is followed by a wait time having a second selected duration, the gamma rays detected during each of the bursts and each of the wait times. A ratio of numbers of gamma rays detected during the bursts is determined (burst ratio). A ratio of numbers of gamma rays detected during the wait times is determined (capture ratio). The burst ratio is used to correct the capture ratio. The petrophysical property is determined from the corrected capture ratio.

Other aspects and advantages will be apparent from the description and claims that follow.

DETAILED DESCRIPTION

Figure 1A:
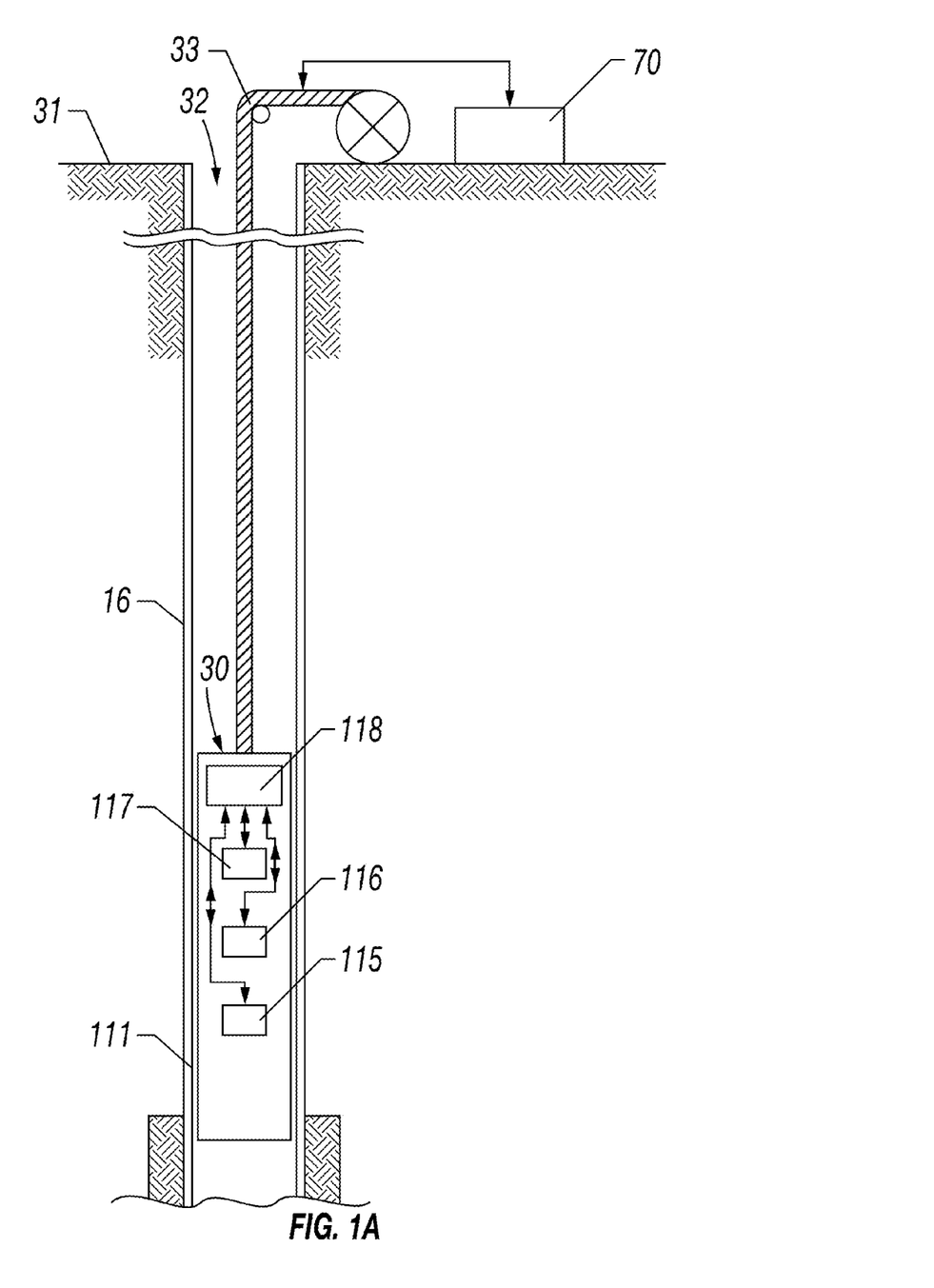
FIG. 1A shows an example well logging instrument conveyed through a wellbore by an electrical cable ("wireline").

FIG. 1A shows an example well logging instrument 30. The measurement components of the instrument 30 may be disposed in a housing 111 shaped and sealed to be moved along the interior of a wellbore 32. The instrument housing 111 may contain at least one energy source 115, e.g., a neutron source such as electrically operated pulsed neutron source (hereinafter "source"), and one or more detectors 116, 117 each disposed at different axial spacings from the source 115. The source 115 may emit neutron radiation. Shielding (not shown) may be disposed in the housing 111 between the source 115 and the detectors 116, 117 to reduce direct transmission of neutrons from the source 115 to the detectors 116, 117. Thus, detected radiation may be characterized at each of a plurality of distances from the source 115, and thus have different lateral response (depth of investigation) into the formations surrounding the wellbore 32. In some example embodiments, two or more different types of well logging instruments, each having a different type of source and different types of corresponding detectors may be included in the same instrument assembly of "tool string."

The instrument housing 111 maybe coupled to an armored electrical cable 33 that may be extended into and retracted from the wellbore 32. The wellbore 32 may or may not include metal pipe or casing 16 therein. The cable 33 conducts electrical power to operate the instrument 30 from a surface 31 deployed recording system 70, and signals from the detectors 116, 117 may be processed by suitable circuitry 118 for transmission along the cable 33 to the recording system 70. The recording system 70 may include a processor, computer or computer system as will be explained below with reference to FIG. 1C for analysis of the detected signals as well as devices for recording the signals communicated along the cable 33 from the instrument 30 with respect to depth and/or time.

The well logging tool described above can also be used, for example, in logging-while-drilling ("LWD") equipment. As shown, for example, in FIG. 1B, a platform and derrick 210 are positioned over a wellbore 212 that may be formed in the Earth by rotary drilling. A drill string 214 may be suspended within the borehole and may include a drill bit 216 attached thereto and rotated by a rotary table 218 (energized by means not shown) which engages a kelly 220 at the upper end of the drill string 214. The drill string 214 is typically suspended from a hook 222 attached to a traveling block (not shown). The kelly 220 may be connected to the hook 222 through a rotary swivel 224 which permits rotation of the drill string 214 relative to the hook 222. Alternatively, the drill string 214 and drill bit 216 may be rotated from the surface by a "top drive" type of drilling rig.

Figure 1B:
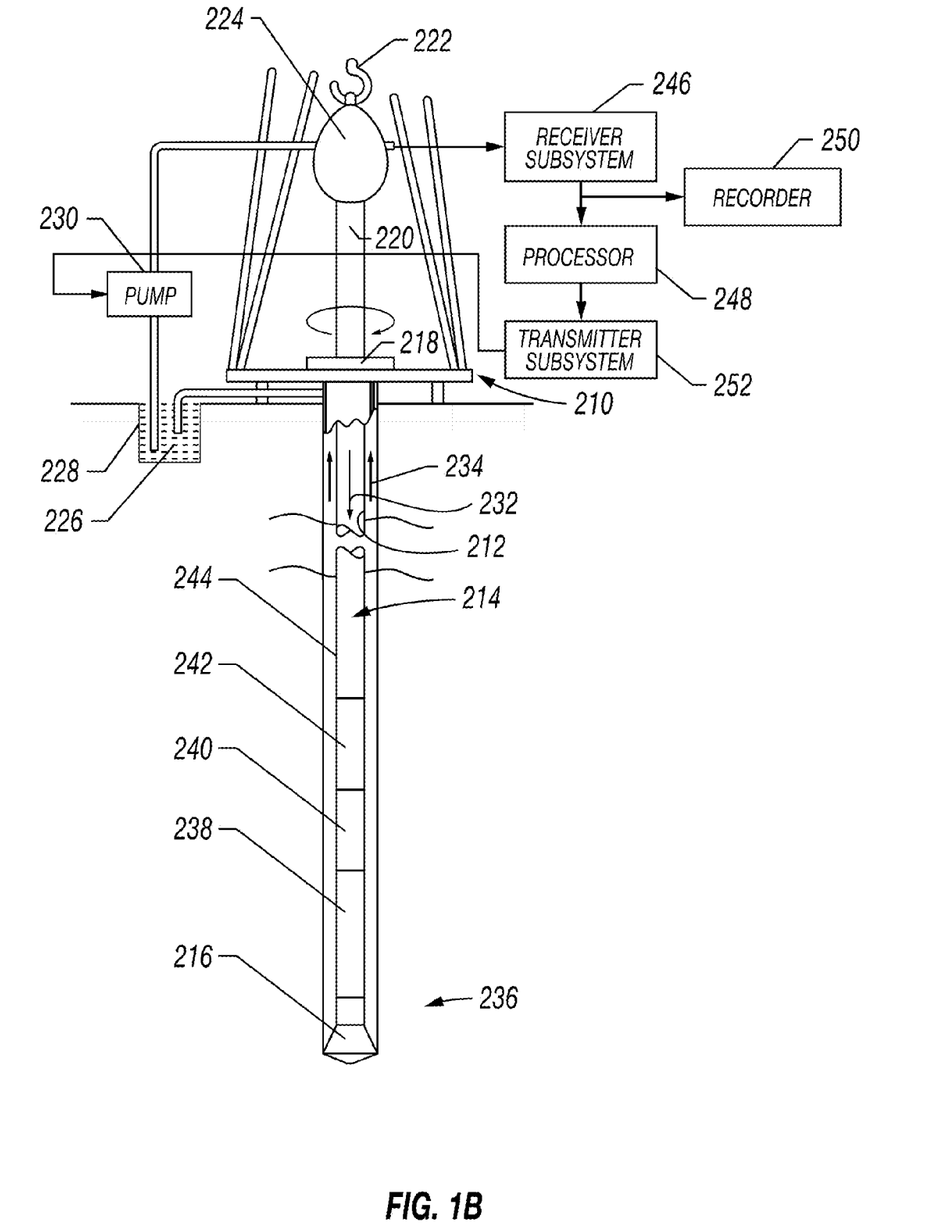
FIG. 1B shows an example logging while drilling instrument on a drill string.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of the drill string 214. The drilling fluid exits the drill string via ports in the drill bit 216 and then circulates upward in the annular space between the outside of the drill string 214 and the wall of the wellbore 212, as indicated by the flow arrows 234. The drilling fluid 226 thereby lubricates the bit and carries formation cuttings to the surface of the earth. At the surface, the drilling fluid is returned to the mud pit 228 for recirculation. If desired, a directional drilling assembly (not shown) could also be employed.

A bottom hole assembly ("BHA") 236 may be mounted within the drill string 214, preferably near the drill bit 216. The BHA 236 may include subassemblies for making measurements, processing and storing information and for communicating with the Earth's surface. Such measurements may correspond to those made using the instrument string explained above with reference to FIG. 1A. The bottom hole assembly is typically located within several drill collar lengths of the drill bit 216. In the illustrated BHA 236, a stabilizer collar section 238 is shown disposed immediately above the drill bit 216, followed in the upward direction by a drill collar section 240, another stabilizer collar section 242 and another drill collar section 244. This arrangement of drill collar sections and stabilizer collar sections is illustrative only, and other arrangements of components in any implementation of the BHA 236 may be used. The need for or desirability of the stabilizer collars will depend on drilling conditions as well as on the demands of the measurement.

In the arrangement shown in FIG. 1B, the components of the well logging instrument may be located in the drill collar section 240 above the stabilizer collar 238. Such components could, if desired, be located closer to or farther from the drill bit 216, such as, for example, in either stabilizer collar section 238 or 242 or the drill collar section 244.

The BHA 236 may also include a telemetry subassembly (not shown) for data and control communication with the Earth's surface. Such telemetry subassembly may be of any suitable type, e.g., a mud pulse (pressure or acoustic) telemetry system, wired drill pipe, etc., which receives output signals from LWD measuring instruments in the BHA 236 (including the one or more radiation detectors) and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly.

The BHA 236 may also include conventional acquisition and processing electronics (not shown) comprising a microprocessor system (with associated memory, clock and timing circuitry, and interface circuitry) capable of timing the operation of the source and the data measuring sensors, storing data from the measuring sensors, processing the data and storing the results, and coupling any desired portion of the data to the telemetry components for transmission to the surface. The data may also be stored in the instrument and retrieved at the surface upon removal of the drill string. Power for the LWD instrumentation may be provided by battery or, as known in the art, by a turbine generator disposed in the BHA 236 and powered by the flow of drilling fluid. The LWD instrumentation may also include directional sensors (not shown separately) that make measurements of the geomagnetic orientation or geodetic orientation of the BHA 236 and the gravitational orientation of the BHA 236, both rotationally and axially.

The foregoing computations may be performed on a computer system such as one shown in the processor at 248 in FIG. 1B, or in the surface unit 70 in FIG. 1A. However, any computer or computers may be used to equal effect.

Figure 1C:
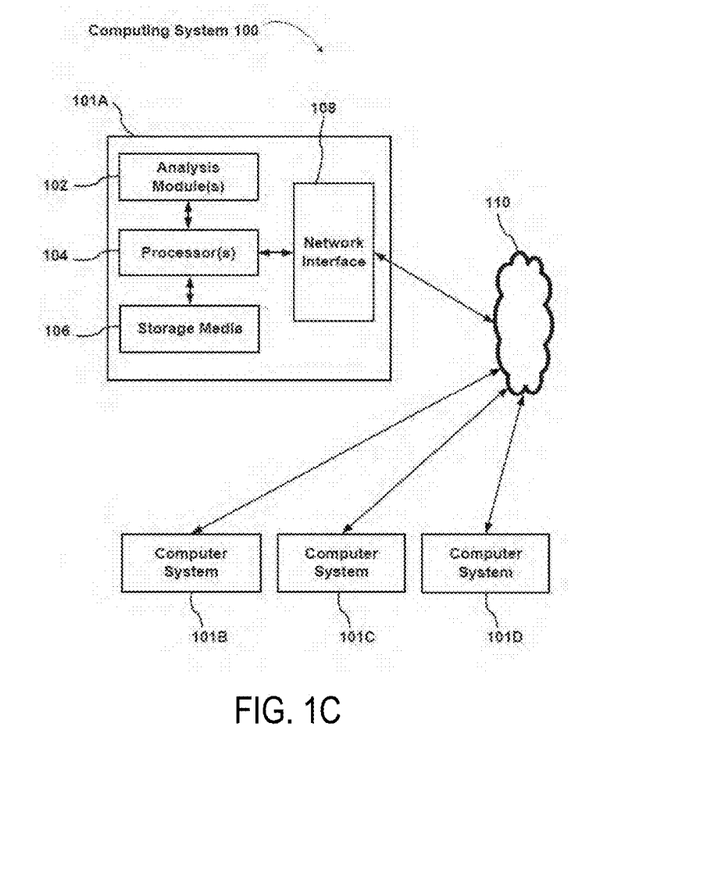
FIG. 1C shows an example computer system that may be used in some implementations.

FIG. 1C shows an example computing system 100 in accordance with some embodiments for carrying out example methods such as those to be explained below with reference to FIGS. 2 through 11. The computing system 100 can be an individual computer system 101A or an arrangement of distributed computer systems. The computer system 101A includes one or more analysis modules 102 that are configured to perform various tasks according to some embodiments, such as the tasks described above. To perform these various tasks, an analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, in a well logging unit disposed proximate a wellbore drilling, while in communication with one or more computer systems such as 101C and/or 101D that are located in one or more data centers on shore, other ships, and/or located in varying countries on different continents). Any one or more of the computer systems may be disposed in the well logging instrument (whether wireline as in FIG. 1A or LWD as in FIG. 1B).

A processor can include a microprocessor, microcontroller, processor module or subsystem, programmable integrated circuit, programmable gate array, digital signal processor (DSP), or another control or computing device.

The storage media 106 can be implemented as one or more non-transitory computer-readable or machine-readable storage media. Note that while in the embodiment of FIG. 1C storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the embodiment of FIG. 1C, and/or computing system 100 may have a different configuration or arrangement of the components depicted in FIG. 1C. The various components shown in FIG. 1C may be implemented in hardware, software, or a combination of both hardware and software, including one or more signal processing and/or application specific integrated circuits.

Further, the steps in the methods described above may be implemented by running one or more functional modules in information processing apparatus such as general purpose processors or application specific chips, such as ASICs, FPGAs, PLDs, SOCs, or other appropriate devices. These modules, combinations of these modules, and/or their combination with general hardware are all included within the scope of protection of the invention.

Figure 1D:
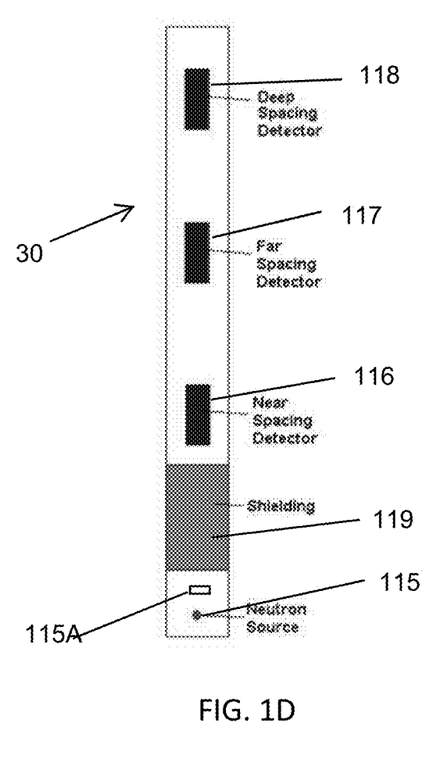
FIG. 1D shows a schematic representation of an example multiple detector neutron well logging instrument.

FIG. 1D shows a schematic cross section of an example neutron well logging instrument structure. Three detectors 116, 117, 118 at various longitudinal spacings from a neutron source 115, e.g., a pulsed neutron source as explained with reference to FIG. 1A, are shown. The detectors 116, 117, 118 may each be a gamma ray detector such as a scintillation crystal optically coupled to a photomultiplier. Shielding 119 between the source 115 and the detectors 116, 117, 118, reduces or prevents the direct passage of radiation from the neutron source 115 to the detectors 116, 117 and 118. The source 115 (pulsed neutron generator) may be based on the deuterium-tritium reaction (with source energy of 14.1 MeV, the deuterium-deuterium reaction (with a source energy of about 2.45 MeV) or any other suitable reaction wherein the energy of the emitted neutrons exceeds 1 MeV. Methods according to the present disclosure may be applied to any form of neutron logging tools with the above described detector and/or neutron source options. Although the example instrument shown in FIG. 1D has three longitudinally spaced apart detectors 116, 117, 118, for purposes of methods according to the present disclosure only two such detectors may be used.

The neutron source 115, when it is on and generating neutrons, will emit high energy neutrons (typically 14 MeV) monochromatically; the energy of the neutrons generated will depend on the particular nuclear reaction use in the pulsed neutron generator. The detectors 116, 117, 118 will detect gamma rays arriving at each detector with respect to time. The gamma rays are generated as a result of interaction of the emitted neutrons with materials in the wellbore and in the surrounding formations. There are two important mechanisms through which a neutron-induced gamma rays can be generated. One important mechanism is neutron inelastic scattering, which can be triggered only by "fast" neutrons (neutrons having energy above approximately 1 MeV; the exact energy threshold depends on the type of nucleus). The other important mechanism for generating neutron induced gamma rays is neutron capture by susceptible nuclei, which can be triggered primarily by thermal neutrons (with energy below around 0.4 eV) or epi-thermal neutrons (with energy from 1 to 100 eV). When the source 115 is on, the gamma rays arriving at the detectors can result from both mechanisms because the source keeps emitting fast neutrons which can inelastically collide with nuclei in the wellbore and surrounding formations as well as slow down to epi-thermal or thermal energy almost instantly ("instantly" in the present context meaning relative to the acquisition system timing). When the source is off, the gamma rays arriving at the detectors can only result from epi-thermal or thermal neutron capture because of the essentially instantaneous reduction of neutron energy by nuclear collision. Thus, the measured gamma ray counting rate at each of the detectors during the source off time is an indirect measurement of the numbers of epi-thermal and thermal neutrons. Such measurements can be used to provide a measurement related to formation hydrogen index (HI). In the present example embodiment, numbers of radiation events detected by the detectors 116, 117, 118 may be normalized for variations in the neutron output of the source 115 by using measurements of neutrons emitted from the source 115, e.g., using a neutron detector 115A disposed inside the instrument 30 proximate the source 115.

Figure 2:
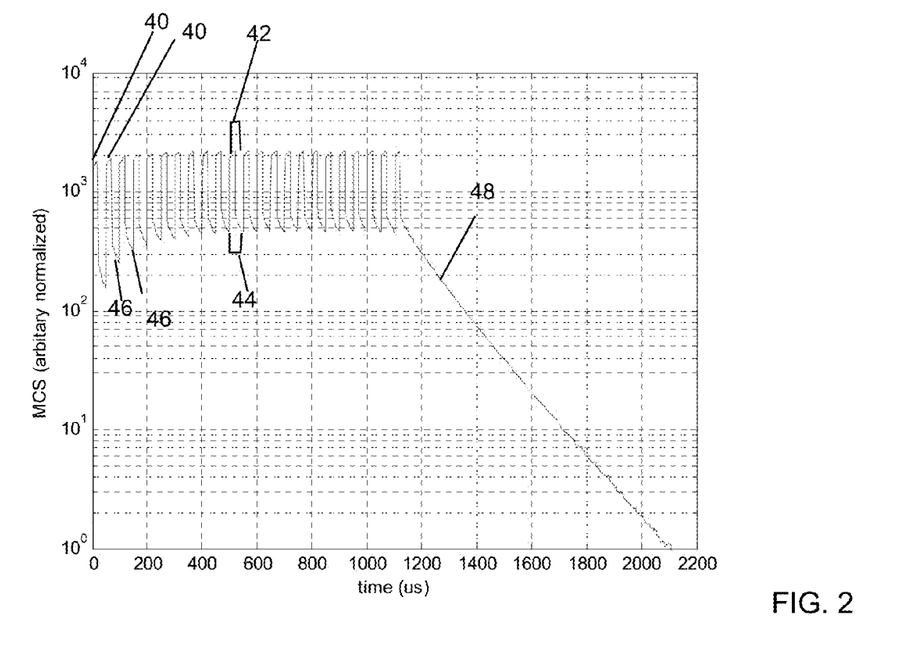
FIG. 2 shows an example embodiment of detection timing that may be used in some embodiments.

FIG. 2 just shows one example of a pulsed neutron source operating cycle that may be used in some embodiments. The graph in FIG. 2 shows gamma ray counting rate at one of the detectors with respect to time. The neutron source (115 in FIG. 1D) may be operated for a plurality of controlled duration "bursts", shown at 40, each followed by a selected duration wait time 46. In the present embodiment, each burst may have a duration, shown at 42, of 20 µs, each wait time, shown at 44, may have a duration of 30 µs, and after a selected number of bursts, the source (115 in FIG. 1D) may be switched off for a selected duration ("long wait time" 48) to enable radiation events caused by the bursts to decay to background level. In the present example embodiment, the long wait time 48 may be 1080 µs. The number of bursts in one cycle in the present embodiment may be 23, although the exact number of bursts in other embodiments may be different.

A burst count rate ratio (BRAT) may be calculated using all the numbers of gamma rays detected during all the source "on" times (all 23 bursts in the present embodiment) at one of the detectors (e.g., 117 in FIG. 1D) with respect to the numbers of gamma rays detected during the source on times at a closer spaced detector (e.g., 116 in FIG. 1D); such detection time intervals may be referred to as "burst gates". A capture ratio (TRAT) may be calculated from measurements of gamma rays made by the same two detectors using one or more "capture" gamma ray detection timing gates. Below are two examples of capture ratio calculated using gamma rays detected during two different timing gates.

Figure 3:
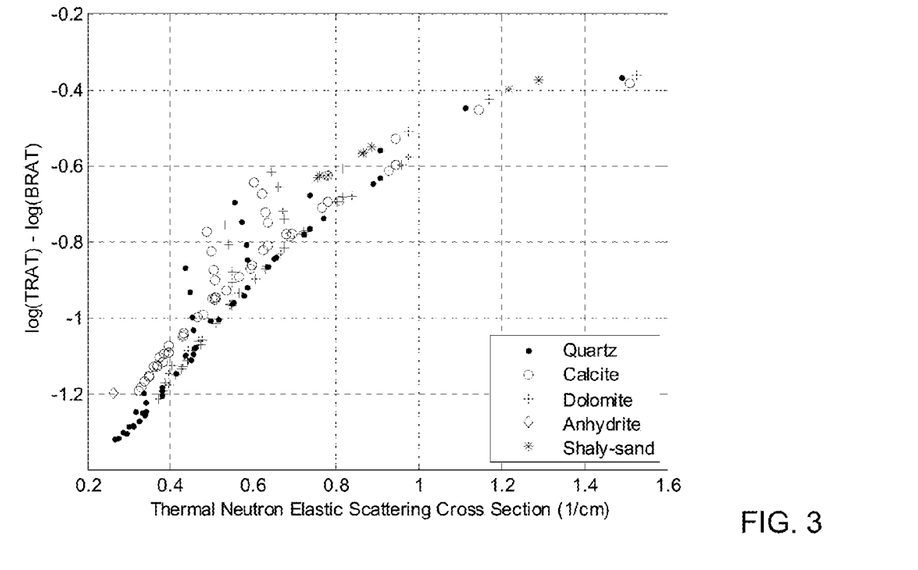
FIG. 3 shows a graph of compensated detector count rate ratio with respect to thermal neutron elastic scattering cross section for a number of different formation conditions and in the same wellbore conditions.

Referring to FIG. 3, TRAT may be calculated using gamma rays detected during substantially all the capture gamma ray detection times, including all the short wait time intervals (46 in FIG. 2) and some or all of the long wait time interval (48 in FIG. 2). A TRAT computed using the foregoing detected gamma rays has substantially no wellbore fluid salinity effect. Other wellbore effects (casing, cement and the type of wellbore fluid, e.g., liquid or gas) can be compensated by a simple equation:

$$x = \log(TRAT) - a \cdot \log(BRAT) \quad (1)$$

Where x is the compensated logarithm of the detector count rate ratio, TRAT is the capture count rate ratio and BRAT is the burst count rate ratio. Coefficient "a" is a constant which can be determined experimentally. In the present example, a has been determined to be unity.

FIG. 3 shows a graph of the compensated ratio x with respect to thermal neutron elastic scattering cross section, for a number of different formation conditions and in the same wellbore conditions. For quartz, calcite and dolomite formations, the fluids filling the pore spaces of each such formation are fresh water, salty water (32.5 ppk, 130 ppk, 260 ppk NaCl concentration; ppk is parts per thousand concentration), methane gas of different densities (0.1 g/cm³, 0.2 g/cm³, and 0.3 g/cm' density) and oil (of densities 0.4 g/cm³, 0.5 g/cm³, 0.6 g/cm³ and 0.7 g/cm³). Shaly-sand for purposes of evaluation is equivalent to 50% quartz mixed with different types of clay minerals.

A compensated ratio x calculated as explained above displays some correlation with thermal neutron capture cross section of the formation, however there are still other properties which can affect the compensated ratio x. For example, quartz and carbonate have identifiably different ratio responses; formation pore water salinity has an effect on the ratio response, 0 pu (1 pu=1% porosity) anhydrite is an outlier, and shaly-sand and quartz (clean sand) behave differently.

Figure 4:
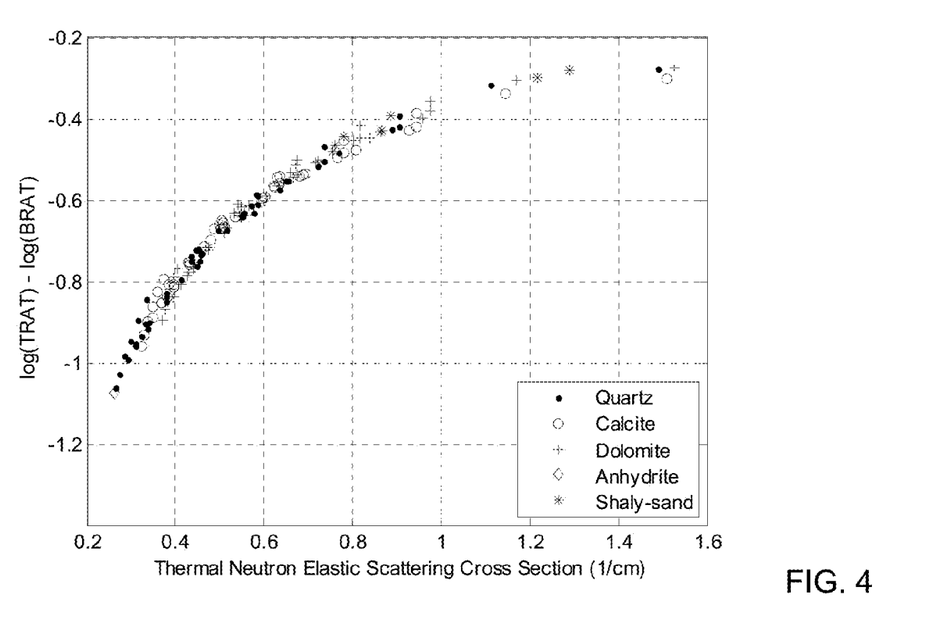
FIG. 4 shows a graph of a difference between the logarithm of detector count rate ratio during neutron bursts and the logarithm of detector count rate ratio between bursts with respect to the thermal neutron elastic scattering cross section (in cm$^{-1}$).

FIG. 4 shows a graph of log(TRAT)–log(BRAT) using only gamma rays detected during the short wait times (46 in FIG. 2) and excludes gamma rays detected during the long wait time (48 in FIG. 2). The TRAT will still have essentially no wellbore fluid salinity effect. Other wellbore effects (casing, cement and borehole fluid/gas) may be compensated using BRAT from the same detection times and using the same equation as explained above. FIG. 4 shows the compensated ratio using only gamma rays detected during the short wait times (46 in FIG. 2) may be accurately described substantially only by the thermal neutron capture cross section.

This example demonstrates the possibility that one can measure the formation thermal neutron elastic scattering cross section quite accurately in cased hole, free of wellbore effect, for many different formation conditions. To obtain such results, the burst timing, the timing gate, and the compensation may be optimized using the burst count rate ratio (BRAT). By adjusting the burst timing (42 and 44 in FIG. 2) and timing gates (46 in FIG. 2) for the capture ratio (TRAT), one can eliminate wellbore salinity effect and formation salinity dependency from the determined capture ratio (TRAT). By compensating TRAT using the burst ratio (BRAT), one can compensate not only for casing/cement effects and the wellbore fluid/gas effect, but also some secondary formation responses that are related to fast neutron transport.

Once a good thermal neutron elastic scattering cross section measurement is obtained using TRAT measured only during the short wait times, compensated by BRAT, such measurement may be converted to hydrogen index and/or porosity φ by assuming a fluid composition in the formation pore space and a mineral composition of the formations. See Eqs. (2) and (3) below, wherein Σtotal represents the determined thermal neutron elastic scattering cross section of the formation, $\Sigma_{matrix}$ represents the thermal neutron elastic scattering cross section of the formation minerals and $\Sigma_{fluid}$ represents the thermal neutron elastic scattering cross-section of the formation pore fluid $$\Sigma_{total} = (1 - \varphi) \cdot \Sigma_{matrix} + \varphi \cdot \Sigma_{fluid} \quad (2)$$

$$\varphi = \frac{\Sigma_{total} - \Sigma_{matrix}}{\Sigma_{fluid} - \Sigma_{matrix}} \quad (3)$$

For neutron porosity made using other known types of neutron porosity instruments, e.g., one having an $^{241}$AmBe chemical isotope source using two, spaced apart $^3$He proportional neutron detectors, it is usually assumed that the formation fluid is fresh water, and the rock mineral composition may be sandstone (quartz), limestone (calcium carbonate) or dolomite (calcium magnesium carbonate) or combinations thereof. The neutron porosity computed using compensated TRAT determined as explained above matches the neutron-neutron porosity measured using other known neutron porosity instruments well, especially in shaly formation conditions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for determining a petrophysical property of a formation, comprising:
    a downhole logging tool comprising a neutron source and at least two gamma ray detectors spaced apart at different positions from the neutron source, said neutron source configured to emit neutrons into the formation at an energy level sufficient to induce inelastic scattering gamma rays, the neutrons emitted in a plurality of bursts of neutrons into the formation, the bursts each having a first selected duration, each burst followed by a wait time having a second selected duration, the gamma rays detected during each of the bursts and each of the wait times;
    a computer configured to receive a number of detected gamma rays at said two different spaced detectors;
    the computer is further configured to
    determine a ratio of numbers of gamma rays detected during the bursts at the two spaced apart positions (burst ratio);
    determine a ratio of numbers of gamma rays detected during the wait times at the two spaced apart positions (capture ratio);
    use the burst ratio to correct the capture ratio;
    determine the petrophysical property from the corrected capture ratio, wherein the petrophysical property comprises thermal neutron elastic scattering cross section; and
    determine a hydrogen index of the formation from the thermal neutron elastic scattering cross section.

2. The system of claim 1 further comprising in the computer determining a porosity of the formation using the hydrogen index and assumed values for thermal neutron elastic scattering cross section of the formation mineral composition and fluid filling pore spaces in the formation.

3. The system of claim 1 wherein the fluid comprises at least one of water, oil and gas and mixtures thereof.

4. The system of claim 1 wherein the mineral composition comprises at least one of quartz, limestone, dolomite and mixtures thereof.

5. The system of claim 4 wherein the mineral composition further comprises at least one clay mineral.

6. The system of claim 1 wherein the gamma rays are detected by scintillation crystals each optically coupled to a photomultiplier.

7. The method system of claim 1 wherein an energy level of the neutrons emitted in each burst have an energy of at least 1 MeV.

8. A method for determining a petrophysical property of a formation, comprising:
    moving a well logging instrument comprising a pulsed neutron source and at least two spaced apart gamma rays detectors along a wellbore drilled through the formation;
    emitting a plurality of bursts of neutrons into the formation, each burst followed by a selected wait time;
    detecting gamma rays during each burst and during each selected wait time at each of the two spaced apart detectors;
    determining a ratio of numbers of gamma rays detected during the bursts at the two spaced apart detectors (burst ratio);
    determining a ratio of numbers of gamma rays detected during the wait times at the two spaced apart detectors (capture ratio);
    using the burst ratio to correct the capture ratio;
    determining the petrophysical property from the corrected capture ratio, wherein the petrophysical property comprises thermal neutron elastic scattering cross section; and
    determining a hydrogen index of the formation from the thermal neutron elastic scattering cross section.

9. The method of claim 8 further comprising determining a porosity of the formation using the hydrogen index and assumed values for thermal neutron elastic scattering cross section of the formation mineral composition and fluid filling pore spaces in the formation.

10. The method of claim 8 wherein the fluid comprises at least one of water, oil and gas and mixtures thereof.

11. The method of claim 8 wherein the mineral composition comprises at least one of quartz, limestone, dolomite and mixtures thereof.

12. The method of claim 11 wherein the mineral composition further comprises at least one clay mineral.

13. The method of claim 8 wherein the gamma detectors comprise scintillation crystals each optically coupled to a photomultiplier.

14. The method of claim 8 wherein an energy level of the neutrons emitted in each burst have an energy of at least 1 MeV.

15. The method of claim 8 wherein the instrument is coupled to an end of an electrical cable.

16. The method of claim 8 wherein the instrument is coupled within a drilling tool assembly.

* * * * *